United States Patent [19]
Doi et al.

[11] Patent Number: 4,913,409
[45] Date of Patent: Apr. 3, 1990

[54] ELECTRONICALLY CONTROLLABLE VIBRATION DAMPER FOR USE WITH AUTOMOTIVE ENGINE OR THE LIKE

[75] Inventors: Kazuhiro Doi, Tokohama; Yasuhiko Fujiwara, Tsukui; Toshiro Abe, Mitaka; Shinichi Matsui, Yokosuka, all of Japan

[73] Assignee: Nissan Motor Company, Limited, Yokohama, Japan

[21] Appl. No.: 214,566

[22] Filed: Jul. 1, 1988

[30] Foreign Application Priority Data

Jul. 2, 1987 [JP] Japan .................. 62-165915

[51] Int. Cl.⁴ .................. F16F 13/00; B60K 5/12
[52] U.S. Cl. .................. 267/140.1; 248/636
[58] Field of Search .......... 267/140.1, 35, 121, 267/141, 219; 248/659, 638, 636, 562

[56] References Cited

U.S. PATENT DOCUMENTS 4,696,489  9/1987  Fujishiro et al. .......... 280/707
4,821,849  4/1989  Miller .................. 188/280

FOREIGN PATENT DOCUMENTS

0183039  10/1985  European Pat. Off. .
0209145   1/1987  European Pat. Off. ......... 267/140.1
3433797   3/1986  Fed. Rep. of Germany .
60-104828 6/1985  Japan .

Primary Examiner—Andres Kashnikow
Assistant Examiner—Mark T. Le
Attorney, Agent, or Firm—Foley & Lardner, Schwartz, Jeffery, Schwaab, Mack, Blumenthal & Evans

[57] ABSTRACT

A vibration damper includes first and second electrode bodies which are operatively connected with a vibrating body and a base, respectively and which are immersed in a rheopetic fluid. The relative velocity and displacement between the body and the base are determined and used to control the voltage applied across the electrode bodies in manner wherein when the relative displacement and velocity are out of phase, a high voltage is applied to electrodes to induce a high damping force and as the period wherein the two parameters go in phase is approchaed, the voltage is continuously reduced to reduce the damping force.

10 Claims, 5 Drawing Sheets

ELECTRONICALLY CONTROLLABLE VIBRATION DAMPER FOR USE WITH AUTOMOTIVE ENGINE OR THE LIKE

BACKGROUND OF THE INVENTION

1. Field of the Invention

The present invention relates to a liquid filled damper which can be used as an engine mount or the like and which exhibits variable damping characteristics.

2. Description of the Prior Art

JP-A-60-104828 discloses an arrangement wherein damping characteristics can be switched between hard and soft under electronic control. However, this arrangement can only be switched between hard and soft modes and as a result when the exciting frequency is high the damping force component is amplified in a manner wherein it exceeds the damping effect provided by the elastomeric spring and induces the drawback that effective vibration damping cannot be achieved.

SUMMARY OF THE INVENTION

It is an object of the present invention to provide an electronically controlled arrangement of the nature disclosed in the above prior art document and which is controllable in a manner which provided effective vibration damping.

In brief, the above object is acheived by an arrangement wherein a vibration damper includes first and second electrode bodies which are operatively connected with a vibrating body and a base, respectively and which are immersed in a rheopetic fluid.

The relative velocity and displacement between the body and the base are determined and used to control the voltage applied across the electrode bodies in a manner wherein when the relative displacement and velocity are out of phase, a high voltage is applied to electrodes to induce a high damping force and as the period wherein the two parameters go in phase is approached, the voltage is continously reduced in order to reduce the damping force.

More specifically, the present invention is deemed to comprise a vibration damping arrangement disposed between a base and a vibrating body, and which is characterized by: a resilient member, the resilient member being operatively connected between the vibrating body and the base, the resilient body acting as a spring which is compressed in response to the relative displacement between the vibrating body and the base; a housing associated with the spring; first and second electrode bodies disposed in the housing, the first and second electrode bodies being immersed in a fluid having rheopectic properties and the viscousity of which changes with the voltage applied across the first and second electrode bodies, the first and second bodies being arranged to be movable relative to one another and to define in combination with the rheopectic fluid, a variable damping device; a sensor arrangement for sensing a parameter which varies with vibration of the vibrating body; a control circuit which is responsive to the sensor for determining the relative velocity and the relative displacement of the vibrating body with respect to the base, the control circuit being arranged to control the voltage applied to the first and second electrode bodies in a manner which reduces the damping effect provided by the variable damping device when the relative displacement and the relative velocity are in phase and which increases the damping effect when the relative displacement and the relative velocity are out of phase.

DETAILED DESCRIPTION OF THE PREFERRED EMBODIMENT

Figure 1:
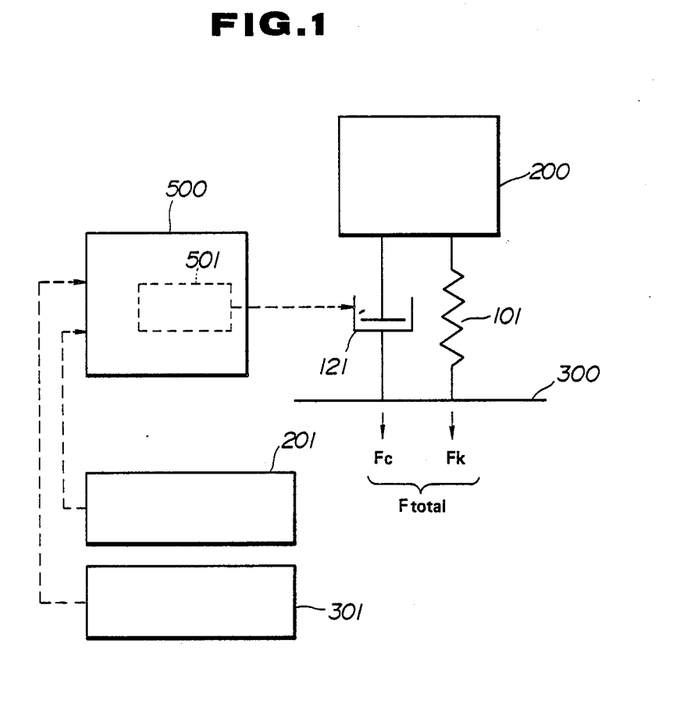
FIG. 1 shows in schematic form the arrangement which characterizes the present invention.
Figure 2:
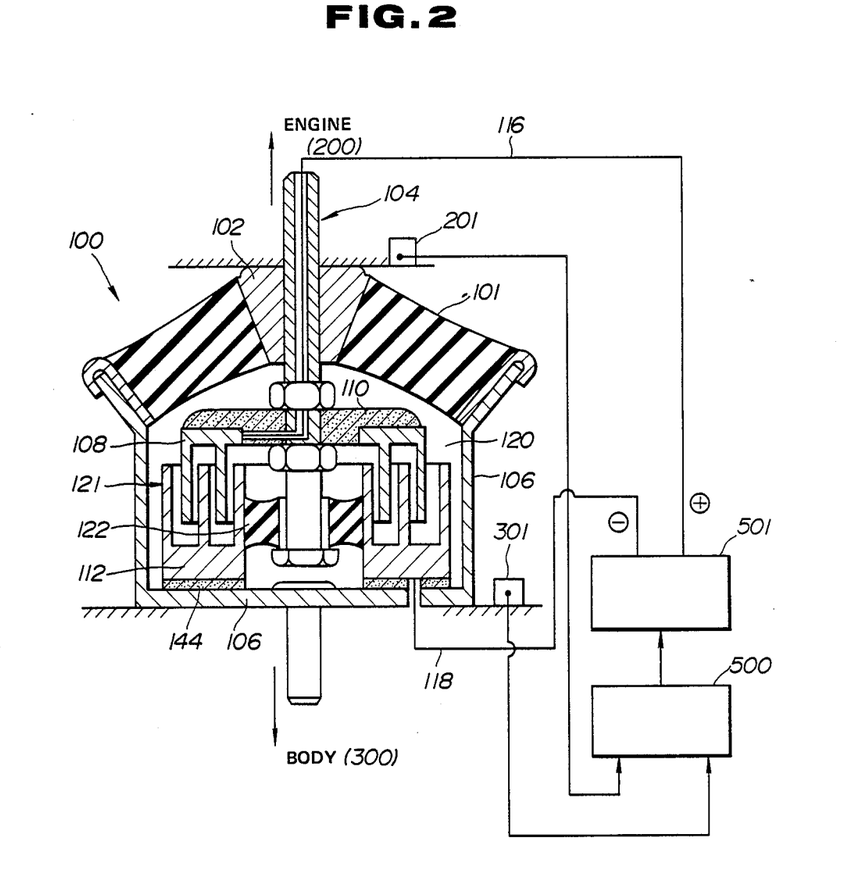
FIG. 2 is a sectional elevation of an embodiment of the present invention.

FIGS. 1 and 2 shows the construction and arrangement of an embodiment of the instant invention. In this arrangement a damper unit generally denoted by the numeral 100 is arranged to support an engine or similar body 200 which is subject to vibration on a vehicle chasis or the like base 300.

The damper unit in this instance includes an elastomeric body 101 (rubber) which acts as a spring. The body 101 is secured to the engine 200 through an upper connector member 102 through which a shaft 104 passes. The upper connector member 102 and the shaft 104 are rigidly connected to the engine 200 in a manner to be vibratable therewith. The outer periphery of the elastomeric body 101 is arranged to sit in and be hermerically connected to the mouth of a cup-like container 106 which is secured to the body 300.

A first electrode body 108 is supported on the shaft 104 and insulated therefrom by a first insulating member 110. A second electrode body 112 is mounted on the bottom of the cup-like member 106 through a second insulating member 114. A first lead line 116 is arranged to pass through a hollow section of the shaft 101 and the first insulating body 110 and to be electrically connected to the first electrode body 108. A second lead line 118 is arranged to pass through concentrically arranged apertures which are formed in the bottom of the cup-like housing 106 and insulating member 114 and be connected to the second electrode body 112.

In this embodiment the first and second electrode bodies include a plurality of concentric annular rib-like projections (no numerals) which are interleaved in the illustrated manner. This of course defines two relatively large and closely juxtaposed surface areas between which a potential can be developed.

The chamber 120 defined within the cup-like member 106 by the elastomeric body 101 is filled with a fluid which exhibits rheopectic properties and which becomes more viscous upon the application of a voltage across the first and second electrode bodies 108, 112 (Winslow effect). The combination of the first and second electrode bodies 108, 112 and the rheopectic fluid define a variable damping arangement which is generally denoted by the numeral 121.

The lower end of the shaft 104 is connected to the second electrode body 112 through a flat annular elastomeric body 122.

This body exerts a centering action on the two electrode bodies 108, 112 and ensures that the two remain in a non-contacting relationship with one another even when subjected to strong vibration.

Sensors 201 and 301 are respectively mounted on the engine and the body and arranged to be responsive to the vertical vibration of the same. The outputs of the sensors are supplied to a control circuit 500. In this instance the control circuit includes a microprocessor in which a suitable algorithm for processing the data inputs and for producing a control signal which is applied to a power source 501, is stored. This power source 501 is connected to the first and second electrode bodies 108, 112 by way of the first and second lead lines 116, 118.

Figure 3:
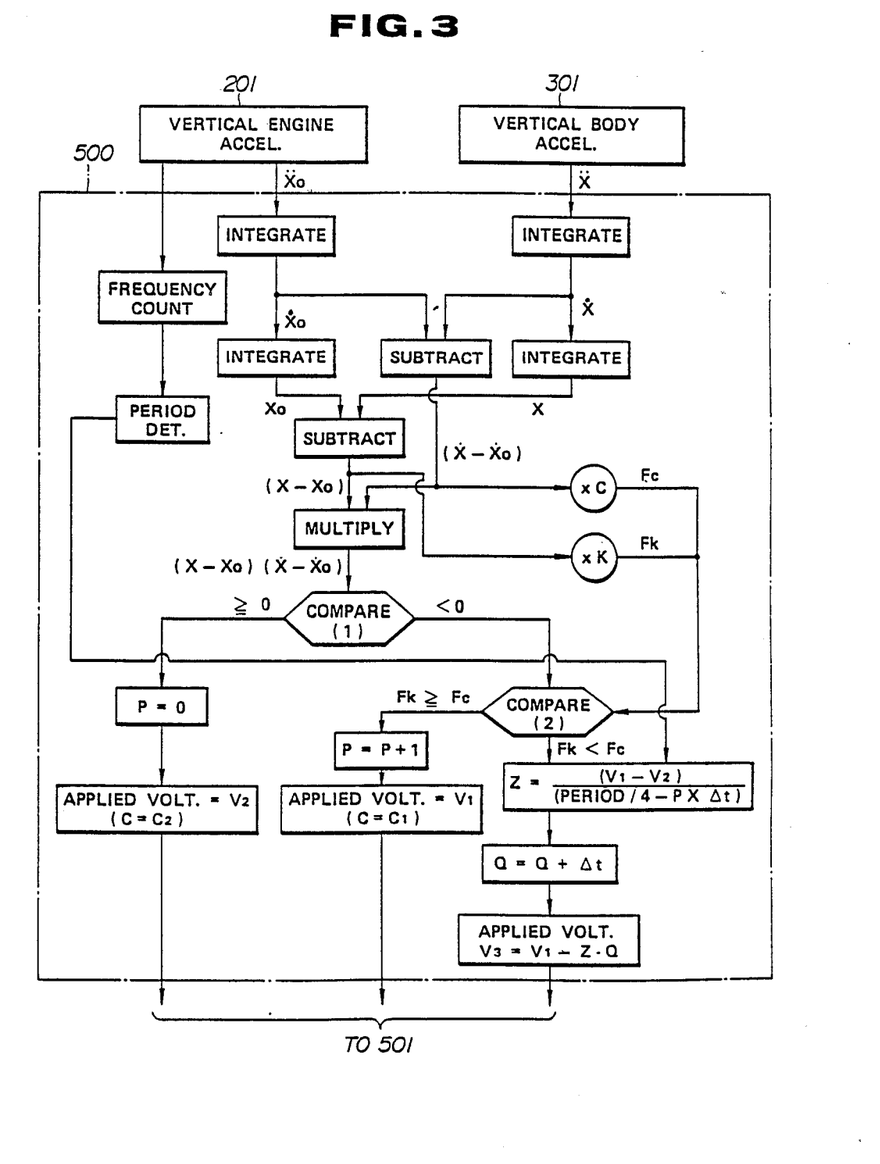
FIG. 3 is a flow chart-like block diagram which shows the steps executed by a algorithm which forms a vital part of the present invention.

The operations performed by the algorithm are depicted in FIG. 3. As shown, the outputs of the two sensors are fed to the interface (not illustrated) of the microprocessor are each subject to a first integration. The resulting velocity values are subtracted in a manner which derives a relative velocity value $(\dot{X}-\dot{X}o)$. Each of the velocity values are then again subject to integration in manner to derive displacement values X and Xo. These values are subject to subtraction in a manner which produces a relative displacement value $(X-Xo)$.

The input of sensor 201 is monitored and a count indicative of the vibration frequency developed. The period of the vibration is derived and set in RAM for later use.

The relative velocity value $(X-Xo)$ is used in combination with the damping coefficient C in a manner to derive a damping force Fc: viz., $$Fc\{=C\times(\dot{X}-\dot{X}o)\} \qquad (1)$$

while the relative displacement value $(X-Xo)$ is used in combination with the spring constant K to derive a Spring force Fk: viz., $$Fk\{=K\times(X-Xo)\} \qquad (2)$$

The relative velocity value and the relative displacement value are multiplied and compared to determine if the product is greater or less than zero. In the event that the outcome is greater than or equal to zero it is indicated that the spring force Fk and the damping force Fc are in phase while when the value is less than zero Fk and Fc are indicated as being out of phase (in reversed phases).

In the event that the comparision reveals that the just mentioned product is greater than zero then the count of a counter P is set to zero and the voltage to be applied is set to a low value V2 which induces a correspondingly low damping coefficient having a value of C2.

However, in the event the outcome of the first comparision indicates a value which is less than zero, then the algorithm proceeds to execute a second comparison wherein the instant values Fc and Fk values are compared. In the event that Fk is greater or equal to Fc then the count of counter P is incrementally increased by one and the voltage to be applied is set at a value of V1 (which induces a damping coefficient having a value C1). At this time sampling time (Delta t) and the count value of P on the previous run are obtained and temporarily set in memory.

In the event that Fk is larger than Fc the the program proceeds to perform calculations which develop values for variables Z and Q using the following equations:

$$Z=(V1-V2)/(\text{PERIOD}-P\,\text{Delta } t) \qquad (3)$$

and $$Q=Q+\text{Delta } t \qquad (4)$$

Following the derivation of this data the voltage to be applied to the electrode bodies is calculated $$V3=V1-Z\cdot Q \qquad (5)$$

As will be appreciated, until the first comparision again indicates a positive outcome the level of the voltage applied to the electrode bodies is continuously reduced. Upon the outcome becoming positive the count of P is returned to zero.

Figure 4:
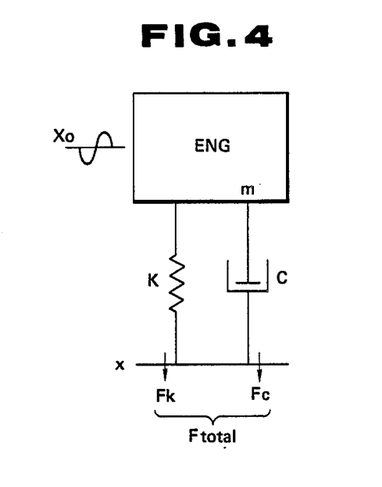
FIG. 4 is schematic diagram which illustrates the arrangement of the engine with respect to the vehicle chassis and the mode in which vibration is transmitted.

The operation of the above described arrangement is such that when the engine is idling the forces which are applied from the vibrating body (engine) to the stationary one or base in the manner shown in FIG. 4

Figure 5:
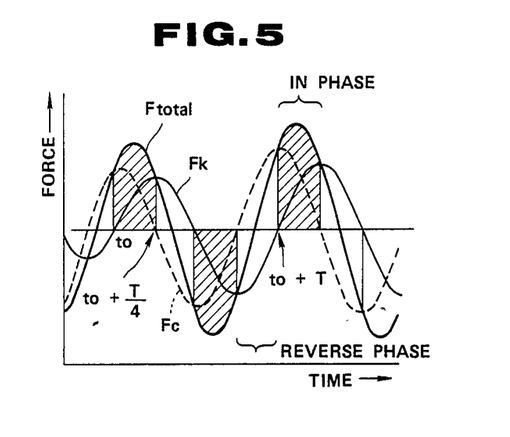
FIG. 5 is a chart defined in terms of force and time which depicts the basic interaction of the forces which are transmitted by the elastomeric spring and the fluid damping arrangements.

As shown in FIG. 5 when:

$$to<t<T/4 \text{ and}$$

$$to+(T/2)<t<to+3T/4$$

then Fk and Fc are in phase. However, when:

$$to+(T/4)<t<to+(T/2) \text{ and}$$

$$to+(3T/4)<t<to+T$$

then Fk and Fc are out of phase.

Thus, as will be seen while the two are in phase the damping force Fc reduces from a peak value, while during the reversed phase period Fc increases towards its peak value. Accordingly, by controlling the manner and the level to which Fc increases, it is possible to variably control the F total force.

Figure 6:
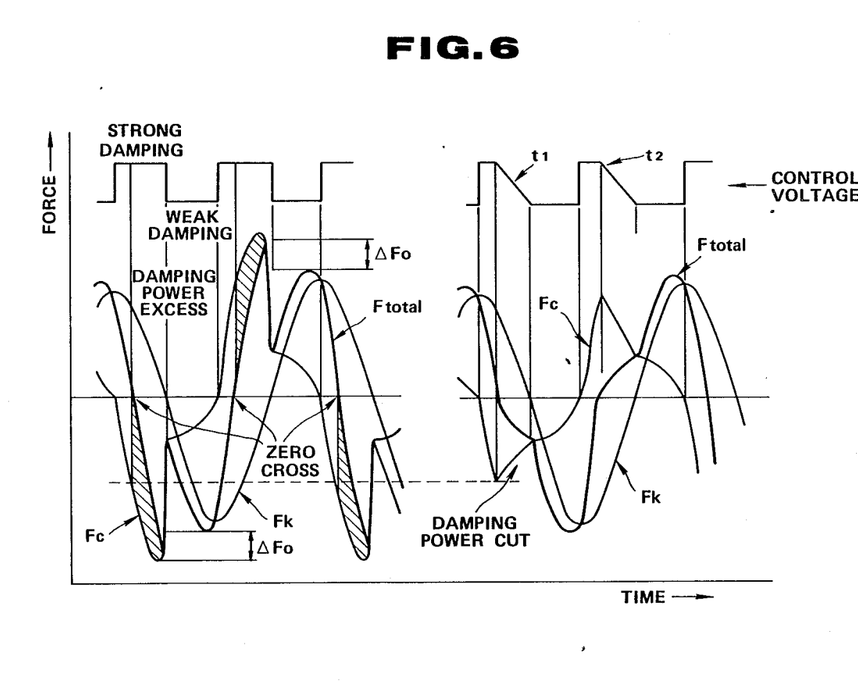
FIG. 6 is a timing chart which shows the operational characteristics derived with the above discussed prior art.

As shown in FIG. 6, when Fc is controlled in a purely digital type ON-OFF manner, the damping force control is only switched between high and low modes. Accordingly, as pointed out in the opening paragraphs of the instant disclosure, this leads to the situation wherein, during the high damping reversed phase period, the damping force Fc becomes notably greater than the spring force Fk and, as shown in hatching, a spike is produced in the transmission power wave and the attenuation provided by the transmitted force F total, is reduced.

Figure 7:
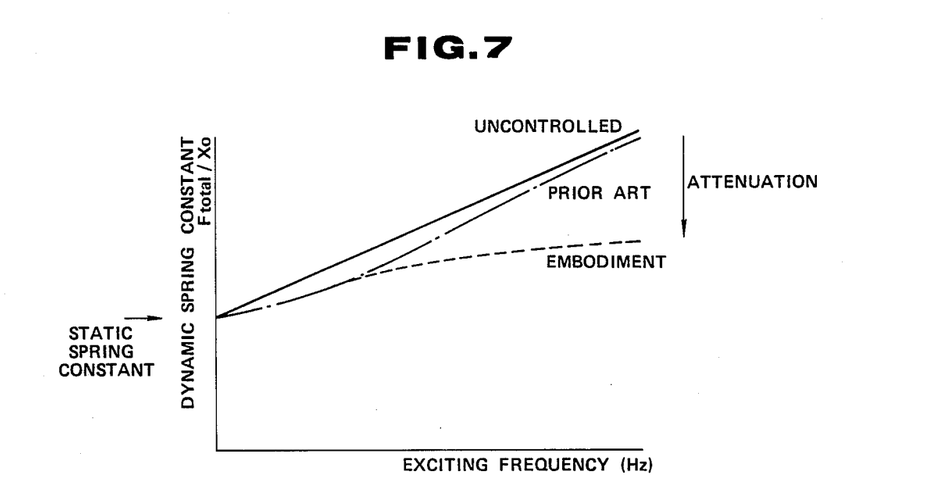
FIG. 7 is a timing chart similar to that shown in FIG. 6 and which shows the control and operational characteristics provided by the instant invention.

In comparison, with the present invention as evident from FIG. 7, during the reversed phase period, as the voltage signal which is applied to the electrode bodies 108, 112 is variably controlled in a manner wherein, during the generation of a high damping force, the level thereof is continuously reduced from time points t1 and t2 (by way of example), a corresponding reduction in damping force Fc is induced.

This, as demonstrated in FIG. 7, is such as to eliminate the spike formation in the transmission power wave and thus improve the damping characteristics of the device under such circumstances.

The arrangement of the present invention is such as to provide the following benefits.

1. During the reversed phase period until the the damping force Fc and the spring force Fk become equal a high damping force is produced. Further, from said time the damping force is switched to a low value. This sequence of damping control is such that vibration over a wide frequency can be attenuated.

2. When the present invention is applied to engine mounts, the idle frequency which tends to be transmitted to the vehicle chasis and induce the generation of cabin reverberation noise can be reduced in a manner which greatly improves the noise levels in the vehicle cabin.

The present invention is not limited to the illustrated type of arrangement and the concept on which the invention is based can be used in other devices without departing from the scope of the present invention. For example, the above described electronic control can be applied with similar advantage to suspension shock absorbers if so desired.

Alternatively, in place of sensing the vibration it is possible in the case of automotive applications use the engine speed as a control parameter in that the engine vibration is related to the engine rotational speed, number of cylinders and the like.

What is claimed is:

1. A vibration damping arrangement disposed between a base and a vibrating body, said damping arrangement comprising:
   a resilient member, said resilient member being operatively connected between said vibrating body and said base, said resilient member exerting a resilient force on said base when a relative displacement between said base and said vibrating body occurs;
   a housing associated with said resilient member;
   first and second electrode bodies disposed in said housing, said first and second electrode bodies being immersed in a fluid having electrorheopetic properties in a manner wherein the viscosity thereof changes with the application of voltage across said first and second electrode bodies, said first and second electrode bodies being arranged to be movable relative to one another and to define in combination with said electrorheopectic fluid, a variable damping device, said variable damping device exerting a damping force on said base, said damping force having a predetermined relationship to a relative velocity between said vibrating body and said base;
   a sensor arrangement for sensing a parameter which varies with the vibration of said vibrating body; and
   a control circuit being responsive to said sensor arrangement for determining the relative velocity and the relative displacement of said vibrating body with respect to said base, said control circuit being arranged to control the voltage applied to said first and second electrode bodies in a manner which sets the damping force to a low level when said relative velocity and relative displacement are in phase, sets the damping force to a high level when said relative displacement and relative velocity are out of phase and the relative displacement is greater than the relative velocity and, continuously decreases the damping force from said high level toward said low level when the relative velocity and relative displacement are out of phase and said relative displacement is less than said relative velocity.

2. A vibration damping arrangement as claimed in claim 1 wherein:
   said first electrode body is rigidly connected to said vibrating body by way of a first electrically insulated connection; and
   said second electrode body is rigidly connected with said base by way of a second electrically insulated connection.

3. A vibration damping arrangement as claimed in claim 2 wherein said first and second electrode bodies include structures which are interleaved.

4. A vibration damping arrangement as claimed in claim 3, wherein said spring comprises a first elastomeric body which is disposed in an opening formed in said housing.

5. A vibration damping arrangement as claimed in claim 1 wherein said sensor arrangement includes;
   a first sensor for sensing the acceleration of said vibrating body; and
   a second sensor for sensing the acceleration of said base.

6. A vibration damping arrangement as claimed in claim 1 wherein the control circuit continuously reduces the voltage applied to said first and second electrode bodies from the time the level of the damping force produced by the variable damping device exceeds the level of the spring force produced by the eastomeric body subsequent to the combination of the damping force and spring force produced by said elastomeric body assuming a zero value during the period the relative displacement and the relative velocity are out of phase.

7. A vibration damping arrangement for disposition between first and second structures, comprising:
   a cup-shaped housing being connected to said first structure;
   an elastomeric member disposed in an opening of said cup-shaped housing, said elastomeric body hermetically closing said cup-shaped housing in a manner to define a single discrete chamber which is filled with an electro-rheopectic fluid, said single discrete chamber being arranged so that said electro-rheopectic fluid cannot be displaced into a separate chamber upon being subject to compression in said single discrete chamber, said elastomeric member providing a connection between said cup-shaped housing and said second structure;
   a first electrode body, said first electrode body including:
   a first base being connected to said cup-shaped housing, said first base being free of apertures through which said electro-rheopectic fluid can flow;
   a first plurality of essentially coaxial annular rib-like projections which extend normally from said first base;
   a connector being disposed sealingly through said elastomeric member, said connector having an outboard end which is arranged to be detachably connected to said second structure, and an inboard end, said inboard end extending into said single discrete chamber;
   a second electrode body, said second electrode body including:
   a second base being operatively connected to said inboard end of said connector, said second base being free of apertures through which said electro-rheopectic fluid can flow;
a second plurality of essentially coaxial annular rib-like members which extend normally from said second base, said second plurality of rib-like members being arranged to be interleaved in a spaced contact free relationship with said first plurality of rib-like members;
means defining an aperture in said housing through which a first lead line is insulatingly disposed, said first lead line being electrically connected with said first electrode body;
means defining an elongate bore in said connector through which a second lead line is insulatingly disposed, said second lead line being electrically connected to said second electrode body; and
a control circuit being operatively connected with said first and second electrode bodies by way of said first and second lead lines, said control circuit being arranged to selectively apply a continuously variable voltage across said first and second electrode bodies.

8. A device having first and second electrode bodies which are immersed in an electro-rheopectic fluid, and wherein said device is operatively connected between first and second structures, comprising:
first and second accelerometers, said first and second accelerometers being mounted on said first and second structures respectively;
means for integrating each of the outputs of said first and second accelerometers in a manner to obtain first and second velocity signals, respectively;
means for subtracting the first and second velocity signals and for developing a first difference signal indicative of the difference between said first and second velocity signals;
means for integrating the first and second velocity signals and for developing first and second displacement signals;
means for subtracting the first and second displacement signals and developing a second difference signal indicative of the difference between said first and second displacement signals;
means for multiplying said first and second difference signals and for developing a first product;
first comparing means for comparing said first product with a predetermined value;
first voltage control means for applying a predetermined voltage to said first and second electrode bodies when said first comparing means indicates that said first product is equal to or greater than said predetermined value;
means for multiplying said first difference signal with a first factor to produce a second product;
means for multiplying said second difference signal with a second factor to produce a third product;
second comparing means for comparing said second and third products;
second voltage control means for applying a second predetermined voltage to said first and second electrodes when said second product is less than or equal said third product; and
third voltage means for applying a variable voltage to said first and second electrode bodies when second product is greater than said third product.

9. A device as claimed in claim 8, wherein said third voltage means is responsive to the period of vibration of said first structure.

10. A vibration damping arrangement for disposition between first and second structures, comprising:
a housing being connected to said first structure;
an elastomeric member disposed in an opening of said housing, said elastomeric body hermetically closing an aperture formed in said housing in a manner to define a single discrete chamber which is filled with an electro-rheopectic fluid, said elastomeric member providing a connection between housing and said second structure;
a first electrode body, said first electrode body including:
a first base being connected to said housing, said first base being free of apertures through which said electro-rheopectic fluid can flow;
a first plurality of essentially coaxial annular rib-like projections which extend normally from said first base;
a connector being disposed sealingly through said elastomeric member, said connector having an outboard end which is arranged to be detachably connected to said second structure, and an inboard end, said inboard end extending into said single discrete chamber;
a second electrode body, said second electrode body including:
a second base being operatively connected to said inboard end of said connector, said second base being free of apertures through which said electro-rheopectic fluid can flow;
a second plurality of essentially coaxial annular rib-like members which extend normally from said second base, said second plurality of rib-like members being arranged to be interleaved in a spaced contact free relationship with said first plurality of rib-like members;
first and second accelerometers being mounted on said first and second structures, respectively; and
a control circuit being operatively connected with said first and second electrode bodies by way of first and second lead lines, said control circuit including:
means for integrating each of the outputs of said first and second accelerometers in a manner to obtain first and second velocity signals, respectively;
means for subtracting the first and second velocity signals and for developing a first difference signal indicative of the difference between said first and second velocity signals;
means for integrating the first and second velocity signals and for developing first and second displacement signals;
means for subtracting the first and second displacement signals and developing a second difference signal indicative of the difference between said first and second displacement signals;
means for multiplying said first and second difference signals and for developing a first product;
means for comparing said first product with a predetermined value;
means for applying a predetermined voltage to said first and second electrode bodies when said first product is equal to or greater than said predetermined value;
means for multiplying said first difference signal with a first factor to produce a second product;
means for multiplying said second difference signal with a second factor to produce a third product;

means for comparing said second and third products when said first product is less than said predetermined value;

means for applying a second predetermined voltage to said first and second electrodes when said second product is less than or equal said third product; and means for applying a variable voltage to said first and second electrode bodies when second product is greater than said third product.

* * * * *